United States Patent

Morrone

[15] 3,659,332
[45] May 2, 1972

[54] METHOD OF PREPARING ELECTRICAL CABLES FOR SOLDERING

[72] Inventor: Ross F. Morrone, Trenton, N.J.
[73] Assignee: Spectra Instruments, Inc., Trenton, N.J.
[22] Filed: May 5, 1969
[21] Appl. No.: 821,834

[52] U.S. Cl. ............... 29/427, 30/140, 81/9.5 R, 29/203, 29/630 A, 219/349, 81/9.51, 134/1, 134/19
[51] Int. Cl. ............................................. B23p 19/02
[58] Field of Search ............... 30/140; 81/9.5 R, 9.51, 9.5 A, 81/9.5 B, 9.5 C; 29/427, 203, 630 A, 497.5; 219/349; 134/1, 19

[56]  References Cited

UNITED STATES PATENTS

| | | | |
|---|---|---|---|
| 2,768,276 | 10/1956 | Arntzen | 81/9.5 B |
| 2,861,166 | 11/1958 | Cargill | 219/349 |
| 2,927,187 | 3/1960 | Wendelken | 219/349 |
| 3,038,985 | 6/1962 | Sisk | 81/9.5 B |
| 3,040,159 | 6/1962 | Lindemann | 30/140 |
| 3,041,439 | 6/1962 | Sisk | 81/9.5 C |
| 3,107,287 | 10/1963 | Schechter | 30/140 |
| 3,139,777 | 7/1964 | Gindoff | 81/9.5 |
| 3,293,956 | 12/1966 | Adamson | 30/140 |
| 3,343,433 | 9/1967 | Rozmus | 81/9.5 |

FOREIGN PATENTS OR APPLICATIONS

| | | | |
|---|---|---|---|
| 856,196 | 11/1952 | Germany | 219/349 |
| 938,499 | 2/1956 | Germany | 219/349 |

Primary Examiner—John F. Campbell
Assistant Examiner—Donald P. Rooney
Attorney—Frederick J. Olsson

[57]  ABSTRACT

The disclosure relates to a method for using infra-red, ultrasonic and mechanical energy in certain desired combinations for the purpose of removing insulating plastic from flat, flexible electrical cables.

4 Claims, 5 Drawing Figures

PATENTED MAY 2 1972 3,659,332

INVENTOR.
Ross F. Morrone
BY
Frederick J. Olsson
ATTORNEY.

3,659,332

METHOD OF PREPARING ELECTRICAL CABLES FOR SOLDERING

This invention relates to methods for removing the insulating material, usually plastic, from flat, flexible electrical cables either at the end of the cable or at a section intermediate the ends in a manner to condition conductors of the cable for soldering.

The nature of modern day electronic equipment has put severe demand and great need for sophisticated wiring methods and material. The problems of signal discrimination, high voltages, heat requirements, miniaturization, hostile environments and the like have accelerated the need.

One of the approaches for solving the wiring problem has been the application of flat cables. While cables of this type appear to be an ideal solution to wiring needs, the use of the same has been slow and not widespread. One of the principle reasons for this is that there have been no satisfactory method for terminating the cables, that is to say, preparing the conductors for soldering to connectors. Various methods have been heretofore proposed as a means for termination, for example, chemical etching, mechanical abrasives, cut and pull techniques, flame treatment and the freeze dip method. All of these techniques have serious disadvantageous which prevented the widespread use of flat cables as a solution to the wiring problems.

The present invention provides a technique having none of the disadvantages of the prior methods and providing for the first time a positive, rapid method for stripping away the insulation either at the end of the cable or at some intermediate point and leaving the conductors in condition for immediate soldering and without disturbing the spacing relation.

The invention will be described below in connection with the drawings wherein.

The term "flat cable" as used herein is meant to include the conventionally known types normally referred to as etched, laminated and ribbon. For practicing the invention, it is essential that the plastic or insulation of such cables be of a type which will vaporize at high temperatures and which contains infra-red absorbing material or is capable of having such material applied to the same.

The invention will be described in connection with a ribbon type cable wherein the conductors are essentially flat and are imbedded in a dielectric material such as Teflon or Kapton.

Figure 1:
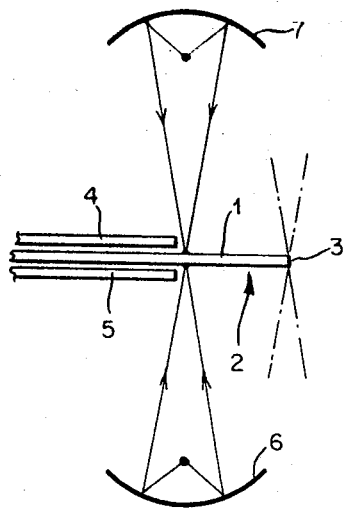
FIGS. 1 and 2 are schematic views illustrating a technique for removing the insulation on the end of a ribbon cable using infra-red and ultra-sonic energy.

FIG. 1 is a schematic showing of an arrangement for removing the insulation from the end 1 of a ribbon cable assembly 2. Cable 2 comprises a plurality of flat conductors spaced side by side one another in the same plane and embedded in a plastic insulating material such as Teflon or Kapton. Since this construction is well known by those skilled in the art I have not shown the details. Where the insulation is Teflon or Kapton which has a pigment for coloring purposes, it is unnecessary to incorporate any infra-red absorbing material. In virgin material, for example, Teflon, one or both faces of the end 1 is painted with a carbon black solution to provide the infra-red absorbing material.

Spaced from the end 3 of the cable I have shown a pair of heat shields 4 and 5 which cover the portion of the plastic which is to remain on the cable and expose the end portion 1 which is to be removed. On opposite sides of cable are the infra-red heat sources 6 and 7. The lamps are adjustably mounted for movement toward and away from the cable and back and forth (left to right as viewed in FIG. 1) over the end 1 of the cable.

The infra-red heat source is preferably a quartz-iodine, hot filament, "line" type lamp. Both the reflector and lamp are elongated so that the radiant energy emitted from the lamp is focused into a line-like or small rectangular area on the cable surface.

Figure 2:
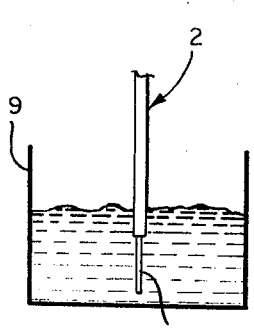

The lamps are positioned so that the focal points are substantially on the surfaces of the cable; ie. so that the radiant energy patterns are on the respective surfaces. The lamps are turned on and moved back and forth over the end 1. The infra-red absorbing material in the cable quickly raises the temperature of the plastic and causes the same to vaporize. This exposes the conductors. The heat shields, of course, absorb the infra-red energy and/or reflect the same away from the covered portions of the cable so that the temperature thereof is not raised sufficiently from vaporization. it turns out that there remains a very thin film of plastic or residue on the conductors. There also may remain a small residue of infra-red absorbing material. While this can be removed by mechanical brushing or abrasive techniques, I have discovered that dipping the exposed conductors 7 in a conventional ultra-sonic bath 9, as indicated in FIG. 2, quickly cleans off the residue and leaves the conductors clean and in ready condition for soldering.

Figure 3:
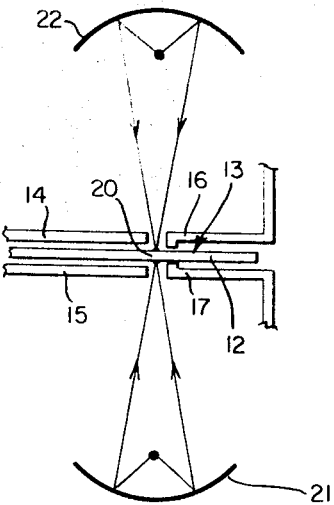
FIG. 3 is a schematic view showing a method for removing the insulation at the end of the ribbon cable using infra-red energy and mechanical energy.

FIG. 3 is a schematic showing of an arrangement for removing the insulation from the end 12 of a ribbon cable assembly 13 using infra-red and mechanical energy.

The cable 13 has the same construction as the cable 2. A pair of heat shields 14 and 15 cover a portion of the plastic which is to remain on the cable. A pair of mechanical grippers 16 and 17 also cover portions of the plastic which is to remain on the cable and serve as heat shields. The heat shields 14—15 and 16—17 are relatively closely spaced from one another preferably less than an eighth of an inch so that a narrow strip-like section 20 is exposed for removal. On either side of the cable are the lamps 21 and 22 having the same construction as lamps 6 and 7. The lamps are positioned so that the respective focal points cause the energy patterns to be on the respective surfaces in the section 20.

With the lamps turned on, the infra-red absorbing material raises the temperature of the plastic in the section 20 and causes the same to vaporize. This leaves the conductors exposed in the narrow strip-like section 20 and effectively separates the plastic in the end 12 from the plastic in the remainder of the cable. The lamps are turned off and then immediately the mechanical grippers grip the end 12 and then are moved to the right (as viewed in FIG. 3) to strip the plastic in the end 12 off of the conductors. The plastic moves off of the conductors in a single unitary piece. Naturally the left side of the cable is held fixed during the stripping.

It is preferable to turn the lamps off before using the mechanical grippers in order that any plastic in the area 20 will have cooled sufficiently to fracture when the grippers are moved.

Also, it is important that the grippers operate at a time when the temperature of the conductors and the plastic in the end 12 is at a level such that the bond between plastic and conductors is broken. With the bond broken the plastic and the end 12 can be stripped away without difficulty.

When the plastic in the end 12 is stripped away the exposed conductors are essentially free from plastic or any other residue and are clean enough to permit immediate soldering.

Figure 4:
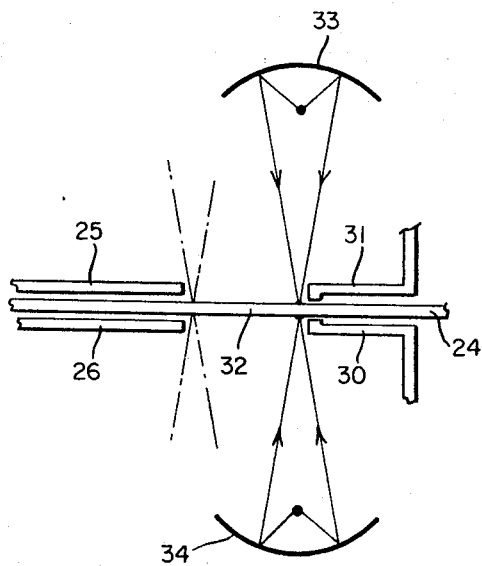
FIGS. 4 and 5 are schematic views showing a method for removing insulation from a center section of the cable using infra-red and mechanical energy.
Figure 5:
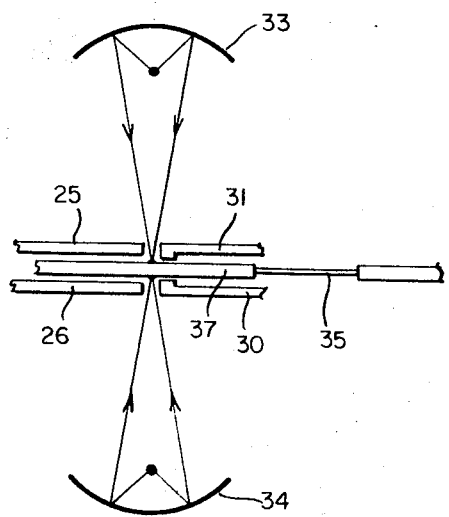

Oftentimes in using flat, flexible cables having wiring it is necessary to make one or more connections inboard or intermediate the ends of the cable. FIGS. 4 and 5 schematically illustrate an arrangement providing for exposing conductors intermediate the ends in ready condition for soldering.

In FIGS. 4 and 5 the ribbon cable assembly 24 has the same construction as the cable 2 in FIG. 1. The heat shields 25 and 26 cover portions of the plastic which is to remain on the cable. The mechanical grippers 30 and 31 also serve as heat shields and cover portions of the plastic to remain on the cable. The ends of the shields 25–26 and 30–31 are spaced from one another (usually about an inch) to provide an exposed area 32.

The lamps 33 and 34 which are of the same construction as lamps 6 and 7 are positioned with their focal points as previously described and after being turned on are moved back and forth (left to right) as viewed in FIG. 4 over the surfaces of the area 32. The plastic in the area 32 vaporizes and exposes conductors. In FIG. 5 the exposed conductors are indicated at 35.

In FIG. 5 the heat shields 25 and 26 and 30 and 31 are moved close to one another (like in FIG. 3) and the cable positioned to expose a narrow strip-like section 36 which is spaced from the exposed conductors 35. The lamps 33 and 34 are positioned similar to lamps 21 and 22 and when turned on cause vaporization of the plastic in the area 36. This exposes the conductors in the section 36. The lamp are turned off and then the mechanical grippers 30 and 31 move down to grip the plastic in the area 37 and pull the same to the right (as viewed in FIG. 5) into the area of the conductors 35. This, or course, exposes the conductors previously covered by the plastic 37. These exposed conductors are in condition for soldering.

Before closing, it is pointed out that in instances where the amount of insulation or plastic to be removed is of relatively short width, the focus of the infra-red lamps can be adjusted so that the heat pattern extends completely over the area to be vaporized. In such instances, of course, it is unnecessary to move the lamps back and forth over the area.

I claim:

1. The method of removing insulating plastic from the conductors of a flat cable, comprising the steps of:
   positioning heat shield means over plastic which is to remain on the cable while exposing an area of plastic which is to be removed;
   focusing the radiant energy of at least one infra-red heat source on unshielded plastic to cause the same to vaporize and expose conductors; and
   emersing the exposed conductors in an ultra-sonic bath to remove residue of plastic from the conductors and to remove infra-red absorbing material from the conductors to thereby condition the exposed conductors for soldering.

2. The method of removing insulating plastic from the conductors of a flat cable, comprising the steps of:
   positioning heat shield means over plastic which is to remain on the cable while exposing an area of the plastic which is to be removed;
   focusing the radiant energy of at least one infra-red heat source on the unshielded plastic in said area to cause the same to vaporize and expose conductors, the area being located inboard of the ends of the cable so that there is insulating plastic on both sides of the area;
   at a point spaced from said exposed conductors in said area positioning heat shield means over the plastic which is to remain on the cable while exposing a narrow strip-like section of the plastic for removal;
   focusing the radiant energy of at least one infra-red heat source on said strip-like section to cause the plastic of the section to vaporize and expose conductors, the section being located inboard of the ends of the cable so that there is insulating plastic on both sides of the strip-like section; and while maintaining heat in the plastic and in the conductors located between said strip-like section and said exposed area at a level sufficient to break the bond between the plastic and conductors, gripping last said plastic and pulling the same over the conductors into said exposed area and thereby exposing other portions of the conductors for soldering.

3. The method of removing insulating plastic from the conductors of a flat cable, comprising steps of:
   focusing the radiant energy of at least one infra-red heat source on plastic of the cable to cause the same to vaporize the plastic and expose conductors; and
   immersing the exposed conductors in an ultra-sonic bath to remove residue of plastic and to remove infra-red absorbing materials from the conductors to thereby condition the exposed conductors for soldering.

4. The method of inboard stripping of insulating plastic from the conductors of a flat cable, comprising the steps of:
   focusing the radiant energy of at least one infra-red heat source on plastic in an area to be removed to cause the plastic to vaporize and expose conductors, the area being located inboard of the ends of the cable so that there is insulating plastic on both sides of the area;
   focusing the radiant energy of at least on infra-red heat source on a narrow strip-like section spaced from said exposed conductors, the energy causing the plastic of the section to vaporize and expose conductors, the strip-like section being located inboard of the ends of the cable so that there is insulating plastic on both sides of the strip-like section and
   while maintaining heat in the plastic and in the conductors located between said strip-like section and said exposed area at a level sufficient to break the bond between the plastic and conductors, gripping last said plastic and pulling the same over the conductors into said exposed area and thereby exposing other portions of the conductors for soldering.

* * * * *